United States Patent
Sun et al.

(10) Patent No.: US 9,632,299 B2
(45) Date of Patent: Apr. 25, 2017

(54) DIGITAL HOLOGRAPHIC MICROSCOPE

(71) Applicant: National Central University, Taoyuan County (TW)

(72) Inventors: Ching-Cherng Sun, Taoyuan County (TW); Yeh-Wei Yu, Taoyuan County (TW)

(73) Assignee: National Central University, Taoyuan (TW)

( * ) Notice: Subject to any disclaimer, the term of this patent is extended or adjusted under 35 U.S.C. 154(b) by 350 days.

(21) Appl. No.: 14/048,006

(22) Filed: Oct. 7, 2013

(65) Prior Publication Data
US 2014/0340476 A1    Nov. 20, 2014

(30) Foreign Application Priority Data
May 16, 2013   (TW) .............................. 102117387 A

(51) Int. Cl.
*G02B 21/36* (2006.01)
*G02B 21/06* (2006.01)
(Continued)

(52) U.S. Cl.
CPC ......... *G02B 21/06* (2013.01); *G02B 21/0008* (2013.01); *G02B 21/14* (2013.01); *G02B 21/361* (2013.01); *G03H 1/0005* (2013.01); *G03H 1/0443* (2013.01); *G03H 2001/005* (2013.01); *G03H 2001/0445* (2013.01); *G03H 2001/0469* (2013.01); *G03H 2001/0471* (2013.01)

(58) Field of Classification Search
CPC .............................. G02B 21/06; G02B 21/361
USPC ........................................................... 348/40
See application file for complete search history.

(56) References Cited

U.S. PATENT DOCUMENTS

| 6,424,404 B1 | 7/2002 | Johnson |
| 2008/0002252 A1 | 1/2008 | Weiss et al. |

(Continued)

FOREIGN PATENT DOCUMENTS

| CN | 1260052 A | 7/2000 |
| CN | 102762143 A | 10/2012 |

(Continued)

OTHER PUBLICATIONS

Vijay Raj Singh, Sui Liansheng, and Anand Asundi, "Compact handheld digital holographic microscopy system development" Proc. of SPIE, 7522, 75244L (2012).
(Continued)

*Primary Examiner* — Nguyen Truong
(74) *Attorney, Agent, or Firm* — CKC & Partners Co., Ltd.

(57) ABSTRACT

A digital holographic microscope is provided. The digital holographic microscope includes a light source, a grating, an image sensing device, and an optical module. The light source is configured for providing a light beam. The grating is disposed between the light source and a sample. The grating is configured for splitting the light beam into a reference light beam and an object light beam. The image sensing device is configured for collecting the reference light beam, and collecting the object light beam reflected from the sample. The optical module is disposed between the light source and the sample, and is configured for guiding the reference light beam to the image sensing device, and guiding the object light beam to the sample.

15 Claims, 8 Drawing Sheets

(51) Int. Cl.
  *G03H 1/00*   (2006.01)
  *G02B 21/00*  (2006.01)
  *G02B 21/14*  (2006.01)
  *G03H 1/04*   (2006.01)

(56) References Cited

U.S. PATENT DOCUMENTS

| | | | |
|---|---|---|---|
| 2009/0128897 A1 | 5/2009 | Liu et al. | |
| 2012/0064534 A1* | 3/2012 | Pipper | B03C 3/017 |
| | | | 435/6.12 |
| 2012/0200901 A1* | 8/2012 | Dubois | G02B 21/00 |
| | | | 359/15 |
| 2013/0003073 A1* | 1/2013 | Yu | G01N 21/453 |
| | | | 356/457 |

FOREIGN PATENT DOCUMENTS

| | | |
|---|---|---|
| EP | 1591809 A1 | 11/2005 |
| JP | 06-258999 | 9/1994 |
| JP | 08-248326 | 9/1996 |
| JP | 2008-122565 | 5/2008 |
| TW | 201138715 A | 11/2011 |

OTHER PUBLICATIONS

Serhan O. Isikman, Waheb Bishara, Onur Mudanyali, Ikbal Sencan, Ting-Wei Su, Derek K. Tseng, Oguzhan Yaglidere, Uzair Sikora, Aydogan Ozcan"Lensfree On-Chip Microscopy and Tomography for Biomedical Applications" IEEE Journal of Selected Topics in Quantum Electronics, 18, 1059-1072 (2012).

* cited by examiner

DIGITAL HOLOGRAPHIC MICROSCOPE

RELATED APPLICATIONS

This application claims priority to Taiwanese Application Serial Number 102117387, filed May 16, 2013, which is herein incorporated by reference.

BACKGROUND

Technical Field

The present disclosure relates to a digital holographic microscope.

Description of Related Art

A digital holographic microscope can obtain the outward appearance of a sample by recording the interference pattern of two light beams. In greater detail, an object light beam impinging on the sample is reflected to an image sensing device to form an interference pattern with a reference light beam. The interference pattern is recorded by the image sensing device and is transformed into a digital signal. The outer appearance of the sample can be determined from the digital signal and an image of the sample is generated from such a determination.

Reference is made to FIG. 1 which is a schematic diagram of a conventional digital holographic microscope. The digital holographic microscope includes a light source 910, a dichroic mirror 920, an image sensing device 930, a supporting substrate 940, and a reflective mirror 950. The supporting substrate 940 is configured for supporting a sample 300. A light beam 912 emitted from the light source 910 can be split into a reference light beam 914 and an object light beam 916 after passing through the dichroic mirror 920. The object light beam 916 passes through the supporting substrate 940, impinges on the sample 300, and is then reflected to the image sensing device 930. Moreover, the reference light beam 914 impinges on the reflective mirror 950, is reflected to the dichroic mirror 920, and is reflected to the image sensing device 930 by the dichroic mirror 920. However, in this digital holographic microscope, the dichroic mirror 920 needs to be aslant disposed between the sample 300 and the image sensing device 930. An angle, such as 45 degrees, is formed between the dichroic mirror 920 and the light collecting surface 932 of the image sensing device 930, resulting in a distance h between the sample 300 and the image sensing device 930. Therefore, the size of the digital holographic microscope remains large and cannot be reduced.

SUMMARY

A digital holographic microscope is provided. The digital holographic microscope includes a light source, a grating, an image sensing device, and an optical module. The light source is configured for providing a light beam. The grating is disposed between the light source and a sample. The grating is configured for splitting the light beam into a reference light beam and an object light beam. The image sensing device is configured for collecting the reference light beam, and collecting the object light beam reflected from the sample. The optical module is disposed between the light source and the sample, and the optical module is configured for guiding the reference light beam to the image sensing device, and guiding the object light beam to the sample.

In one or more embodiments, the optical module has a measuring area and a non-measuring area. The sample is disposed at the measuring area. The object light beam is able to pass through the measuring area of the optical module and impinge on the sample, and the reference light beam is able to impinge on the non-measuring area of the optical module and being reflected to the image sensing device.

In one or more embodiments, the digital holographic microscope further includes a light intensity modulator disposed between the grating and the optical module. The light intensity modulator is configured for modulating the light intensity of one of the object light beam and the reference light beam.

In one or more embodiments, the grating and the light intensity modulator form an active light splitting element.

In one or more embodiments, the digital holographic microscope further includes a hydrophobic material layer covering at least one portion of a surface at the non-measuring area of the optical module facing the sample and surrounding the measuring area.

In one or more embodiments, the optical module has a recess formed in a surface of the optical module facing the sample, wherein the recess is at the measuring area.

In one or more embodiments, the optical module and the grating form a holographic optical element with a diffraction pattern.

In one or more embodiments, the diffraction efficiency of the holographic optical element is smaller than 20% and larger than 0.1%.

In one or more embodiments, the holographic optical element is substantially parallel to a light collecting surface of the image sensing device.

In one or more embodiments, the digital holographic microscope further includes a light intensity modulator disposed between the holographic optical element and the sample. The light intensity modulator is configured for modulating the light intensity of the object light beam.

In one or more embodiments, the digital holographic microscope further includes at least one reflective side wall disposed between the holographic optical element and the image sensing device. The reflective side wall is configured for guiding the object light beam reflected from the sample to the image sensing device.

In one or more embodiments, an angle is formed between the reflective side wall and a normal line of the holographic optical element, and the angle is greater than 0 degrees and less than or equal to 60 degrees.

In one or more embodiments, the digital holographic microscope further includes a supporting plate configured for supporting the sample.

In one or more embodiments, the digital holographic microscope further includes a hydrophobic material layer covering at least one portion of a surface of the supporting plate facing the sample, and the hydrophobic material layer surrounds the sample.

In one or more embodiments, the supporting plate has a recess configured for accommodating the sample.

In one or more embodiments, the digital holographic microscope further includes a lens disposed between the light source and the optical module.

In one or more embodiments, the digital holographic microscope further includes a reflective element disposed between the light source and the optical module.

In one or more embodiments, the digital holographic microscope further includes a guiding medium disposed between the optical module and the image sensing device. The guiding medium has a guiding surface.

In one or more embodiments, the image sensing device is a charged-couple device (CCD) or a complementary metal oxide semiconductor (CMOS).

In one or more embodiments, the digital holographic microscope further includes a reflective cover disposed at a side of the sample opposite to the optical module.

DETAILED DESCRIPTION

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically depicted in order to simplify the drawings.

Figure 2:
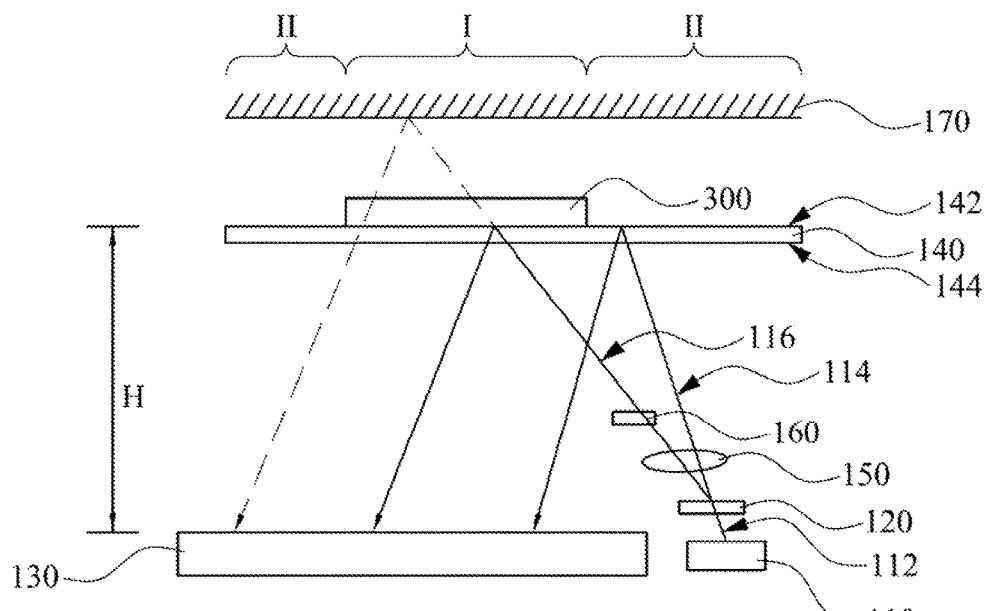
FIG. 2 is a schematic diagram of a digital holographic microscope according to a first embodiment of the present invention.

FIG. 2 is a schematic diagram of a digital holographic microscope according to a first embodiment of the present invention. The digital holographic microscope includes a light source 110, a grating 120, an image sensing device 130, and an optical module 140. The light source 110 is configured for providing a light beam 112. The grating 120 is disposed between the light source 110 and a sample 300, and the grating 120 is configured for splitting the light beam 112 into a reference light beam 114 and an object light beam 116. The image sensing device 130 is configured for collecting the reference light beam 114, and collecting the object light beam 116 reflected from the sample 300. The optical module 140 is disposed between the light source 110 and the sample 300, and the optical module 140 is configured for guiding the reference light beam 114 to the image sensing device 130, and guiding the object light beam 116 to the sample 300.

The digital holographic microscope according to the first embodiment of the present invention will be described in greater detail. The light source 110 can be a laser, but the scope of the claimed invention should not be limited in this respect. The light beam 112 emitted from the light source 110 is incident the grating 120. The light beam 112 is spatially split into at least two light beams due to the splitting function of the grating 120. Two of the at least two light beams which are split by the grating 120 can be chosen to be the reference light beam 114 and the object light beam 116, respectively. The reference light beam 114 and the object light beam 116 propagate to the optical module 140 along different light paths. In this embodiment, the optical module 140 has a measuring area I and a non-measuring area II. The sample 300 is disposed on a surface 142 of the optical module 140 opposite to the light source 110, and is disposed in the measuring area I of the optical module 140. The object light beam 116 is incident the other surface 144 of the optical module 140 and reaches the measuring area I of the optical module 140. The object light beam 116 then passes through the optical module 140 to the sample 300. The object light beam 116 is reflected from the sample 300 and passes through the optical module 140 again, then reaches the image sensing device 130. Moreover, the reference light beam 114 is incident the non-measuring area II of the optical module 140, and is reflected to the image sensing device 130 by the optical module 140. Therefore, an interference pattern can be formed by the interference between the reference light beam 114 and the object light beam 116 at the image sensing device 130. The interference pattern is recorded by the image sensing device 130 and is transformed into a digital signal. The outer appearance of the sample 300 can be determined from the digital signal, and an image of the sample 300 is generated from such a determination.

Since the digital holographic microscope of the present embodiment includes the grating 120 to replace the dichroic mirror used in the conventional digital holographic microscope, no dichroic mirror needs to be aslant disposed between the sample 300 and the image sensing device 130. Consequently, a distance H between the sample 300 and the image sensing device 130 can be smaller than the corresponding distance h (see FIG. 1) in the conventional digital holographic microscope. Therefore, the digital holographic microscope of the present embodiment can be made to a small size due to the relatively small distance H.

In this embodiment, the grating 120 is a transmission grating, which mainly generates a zero order diffraction light beam and two first order diffraction light beams when the light beam 112 passes through the grating 120. Any two of the diffraction light beams generated by the grating 120 can be chosen to be the reference light beam 114 and the object light beam 116, respectively.

In addition, the optical module 140 of the present embodiment can support the sample 300, i.e., the sample 300 can be disposed on the surface 142 of the optical module 140. The optical module 140 can be a transparent plate, for example, a glass plate or a plastic plate, such that the object light beam 116 can pass through the optical module 140 to the sample 300. Moreover, the reference light beam 114 can be incident from the surface 144 of the optical module 140, i.e., the transparent plate, to the other surface 142 of the optical module 140. A portion of the reference light beam 114 can be reflected by the surface 142 due to the reflective index difference between the transparent plate and the environment which is the air in this embodiment. This portion of the reference light beam 114 can be reflected to the image sensing device 130. In one or more embodiments, a reflective layer (not shown) is disposed on the surface 142 of the optical module 140 to enhance the reflective light intensity of the reference light beam 114 on the surface 142. For example, the reflective layer can be coated on the non-measuring area II of the optical module 140. In this way, the light intensity of the reference light beam 114 at the image sensing device 130 can be increased without affecting the transmitting light intensity of the object light beam 116 passing through the measuring area I of the optical module 140.

In one or more embodiments, the image sensing device 130 can be a charge-coupled device (CCD) or a complementary metal-oxide-semiconductor (CMOS). However, the scope of the claimed invention should not be limited in these respects. A person having ordinary skill in the art can select a proper image sensor for use as the image sensing device 130 according to actual requirements.

In one or ore embodiments, the digital holographic microscope can further include a lens 150 disposed between the light source 110 and the optical module 140. The lens 150 can diverge the reference light beam 114 and the object light beam 116 to be formed into spherical waves. A larger light angle is covered by the reference light beam 114 when it is a spherical wave, and the interference pattern between the object light beam 116 and the reference light beam 114 can be magnified when the object light beam 116 is a spherical wave. The pattern widths of the magnified interference pattern are wider, so as to facilitate more efficient signal analysis. Moreover, the lens 150 is disposed between the grating 120 and the optical module 140 in the present embodiment, i.e., the reference light beam 114 and the object light beam 116 pass through the lens 150 after they are split from the light beam 112. However, the scope of the claimed invention should not be limited in this respect. In other embodiments, the lens 150 can be disposed between the light source 110 and the grating 120. That is, after being formed into a spherical wave, the light beam 112 passes through the grating 120 and is split into the reference light beam 114 and the object light beam 116. In addition, although the lens 150 shown in FIG. 2 is a convex lens, the lens 150 can be a concave lens in other embodiments.

In one or more embodiments, the digital holographic microscope can further include a light intensity modulator 160 disposed between the grating 120 and the optical module 140, and the light intensity modulator 160 is configured for modulating the light intensity of one of the reference light beam 114 and the object light beam 116. The light intensities of the reference light beam 114 and the object light beam 116 at the image sensing device 130 can be adjusted to obtain a high-quality interference pattern. In the present embodiment, the light intensity modulator 160 can be disposed on the propagation path of the object light beam 116, so as to modulate the light intensity of the object light beam 116 based on the light intensity of the reference light beam 114 at the image sensing device 130, such that the light intensities of the reference light beam 114 and the object light beam 116 at the image sensing device 130 can be matched to obtain a high-quality interference pattern. However, in other embodiments, the light intensity modulator 160 can be disposed on the propagation path of the reference light beam 114, so as to modulate the light intensity of the reference light beam 114 based on the light intensity of the object light beam 116 at the image sensing device 130.

The light intensity modulator 160 can include a liquid crystal light polarizing modulator and at least one polarizer. For example, the light beam 112 has a specific polarized direction composed by two orthogonal polarized states with different or the same components. The liquid crystal light polarizing modulator is configured for adjusting the components of the two orthogonal polarized states, which means that the polarized direction of a light beam can be adjusted after passing through the liquid crystal light polarizing modulator, and the polarized direction depends on the voltage applied to the liquid crystal light polarizing modulator. Moreover, the polarizer is configured for filtering light with predetermined polarized directions. In greater detail, in the present embodiment, the object light beam 116 or the reference light beam 114 passing through the light intensity modulator 160 has the same polarized direction as the light beam 112, whose polarized direction is composed by two orthogonal polarized states. Taking the object light beam 116 as an example, the polarized direction of the object light beam 116 can be changed so that it is incident the liquid crystal light polarizing modulator. Subsequently, a portion of the object light beam 116 can be filtered by the liquid crystal light polarizing modulator, in which the filtered light intensity depends on the voltage applied to the liquid crystal light polarizing modulator. Moreover, the object light beam 116 or the reference light beam 114 can pass through another polarizer before being incident the liquid crystal light polarizing modulator if the light beam 112 is unpolarized, such that the object light beam 116 or the reference light beam 114 is polarized so as to be incident the liquid crystal light polarizing modulator.

It is noted that the light intensity modulator 160 in the present embodiment controls light intensity through polarization. However, the light intensity modulator 160 in other embodiments can be a filter, such as an optical density filter.

In one or more embodiments, the grating 120 and the light intensity modulator 160 can be combined into a single active light splitting element for splitting the light beam 112 into the reference light beam 114 and the object light beam 116 while adjusting the light intensity ratio between the reference light beam 114 and the object light beam 116. Such an active light splitting element can be an acousto-optic modulator (AOM). However, the scope of the claimed invention should not be limited in this respect.

In one or more embodiments, the digital holographic microscope can further include a reflective cover 170 disposed at a side of the sample 300 opposite to the optical module 140. A portion of the object light beam 116 incident the sample 300 can pass through the sample 300, as shown by the dashed line arrow in FIG. 2, if the sample 300 is transparent. The reflective cover 170 reflects this portion of the object light beam 116 to the image sensing device 130 to enhance the light intensity of the object light beam 116. Moreover, the reflective cover 170 can have a flat or rough reflective surface. The object light beam 116 can form a large angle light beam after being reflected by the rough reflective surface of the reflective cover 170, such that a wider interference pattern can be formed by the object light beam 116 and the reference light beam 114 at the image sensing device 130, allowing more information of the sample 300 to be obtained.

Figure 3:
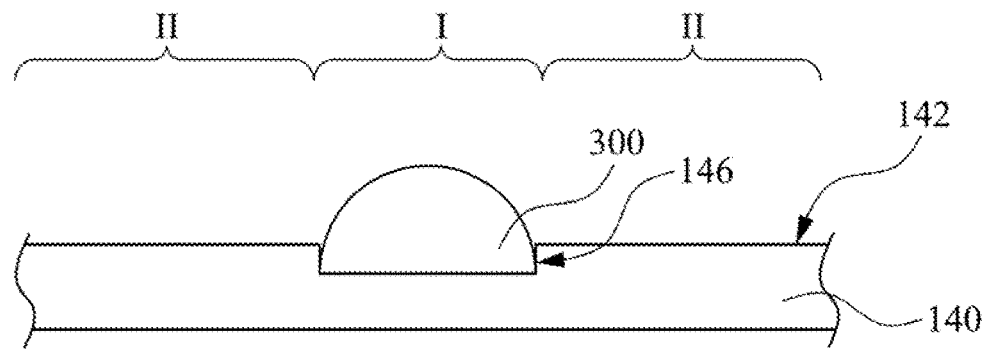
FIG. 3 is a localized schematic diagram of a sample and an optical module according to one embodiment of the present invention.

Reference is made to FIG. 3 which is a localized schematic diagram of the sample 300 and the optical module 140 according to one embodiment of the present invention. In one or more embodiments, the optical module 140 supporting the sample 300 can have a recess 146 when the sample 300 is in a liquid state. The recess 146 is formed in the surface 142 of the measuring area I of the optical module 140, and the recess 146 is configured for accommodating the sample 300.

Figure 4:
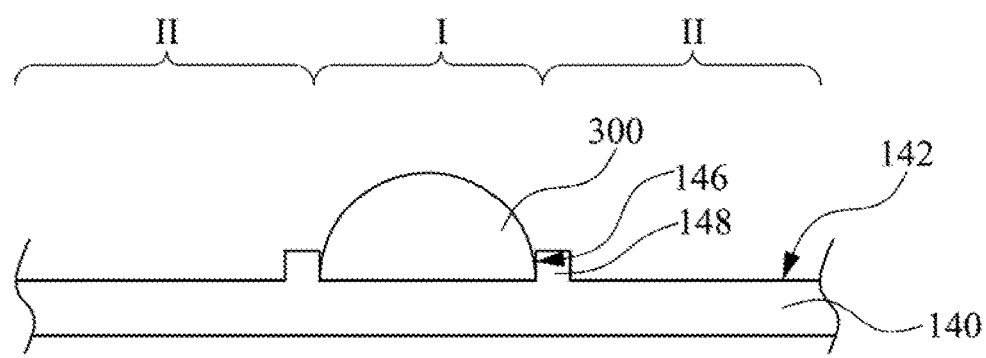
FIG. 4 is a localized schematic diagram of the sample and the optical module according to another embodiment of the present invention.

The structure of the recess 146 is not limited to the configuration shown in FIG. 3. Reference is made to FIG. 4 which is a localized schematic diagram of the sample 300 and the optical module 140 according to another embodiment of the present invention. The optical module 140 has a salient portion 148 disposed at the surface 142 of the optical module 140. The salient portion 148 surrounds the measuring area I of the optical module 140 to form the recess 146 configured for accommodating the sample 300.

Figure 5:
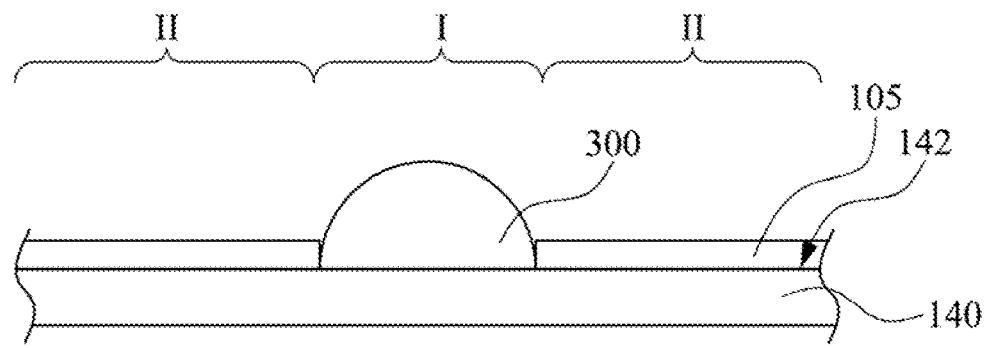
FIG. 5 is a localized schematic diagram of the sample and the optical module according to yet another embodiment of the present invention.

Reference is made to FIG. 5 which is a localized schematic diagram of the sample 300 and the optical module 140 according to yet another embodiment of the present invention. In this embodiment, the digital holographic microscope can further include a hydrophobic material layer 105 covering at least one portion of the surface 142 of the optical module 140 at the non-measuring area II thereof, and the hydrophobic material layer 105 surrounds the measuring area I, such that the sample 300 in the liquid state can be confined to the measuring area I.

Figure 6:
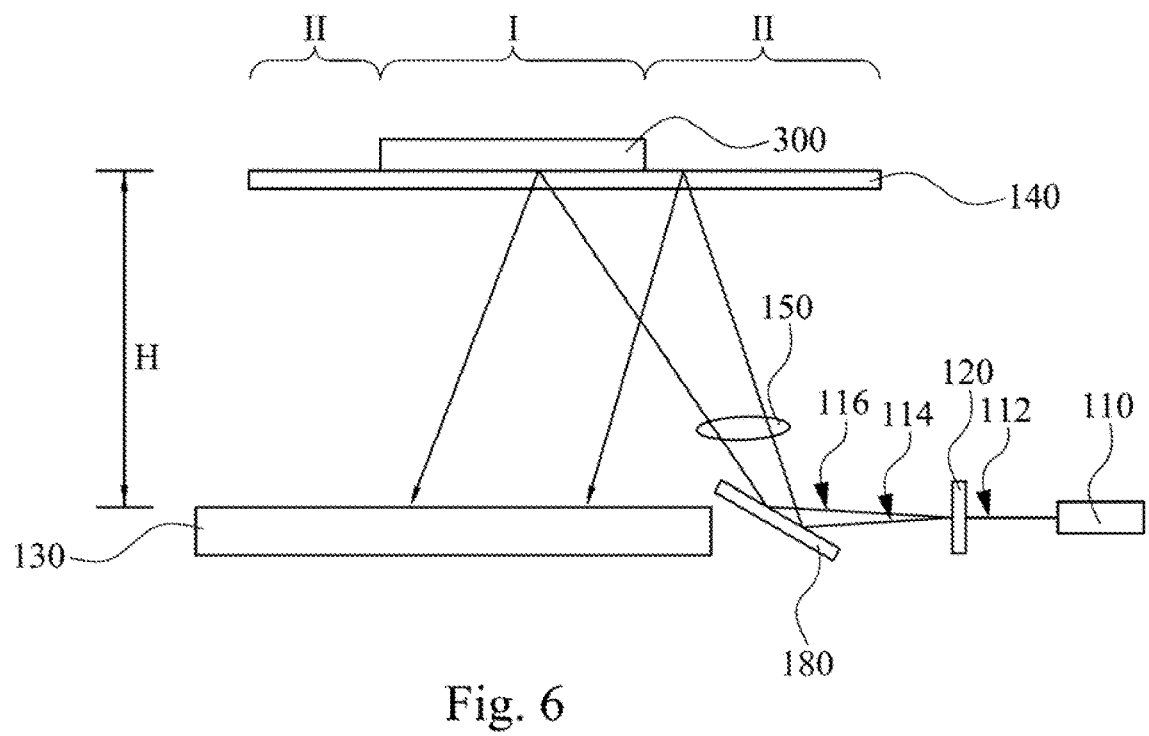
FIG. 6 is a schematic diagram of the digital holographic microscope according to a second embodiment of the present invention.

FIG. 6 is a schematic diagram of a digital holographic microscope according to a second embodiment of the present invention. The difference between the second embodiment and the first embodiment is that a reflective element 180 is disposed between the light source 110 and the optical module 140. The reflective element 180 is configured for adjusting the propagation direction of the reference light beam 114 and the object light beam 116. By disposing the reflective element 180 in a particular manner as shown in FIG. 6, the grating 120 and the light source 110 can be moved to a side of the reflective element 180 opposite to the image sensing device 130 to further reduce the distance H between the sample 300 and the image sensing device 130. In addition, the digital holographic microscope in this embodiment can accommodate a larger light source 110.

Moreover, the lens 150 is disposed between the reflective element 180 and the optical module 140 in the present embodiment. However, the scope of the claimed invention should not be limited in this respect. Other configurations fail within the scope of the claimed invention, such as disposing the lens 150 between the reflective element 180 and the grating 120, or between the grating 120 and the light source 110.

Furthermore, while not shown in FIG. 6, the digital holographic microscope in the present embodiment can further include the light intensity modulator 160 and/or the reflective cover 170 (see FIG. 2). Other relevant structural details of the second embodiment are all the same as the first embodiment, and, therefore, a description in this regard will not be repeated hereinafter.

Figure 7A:
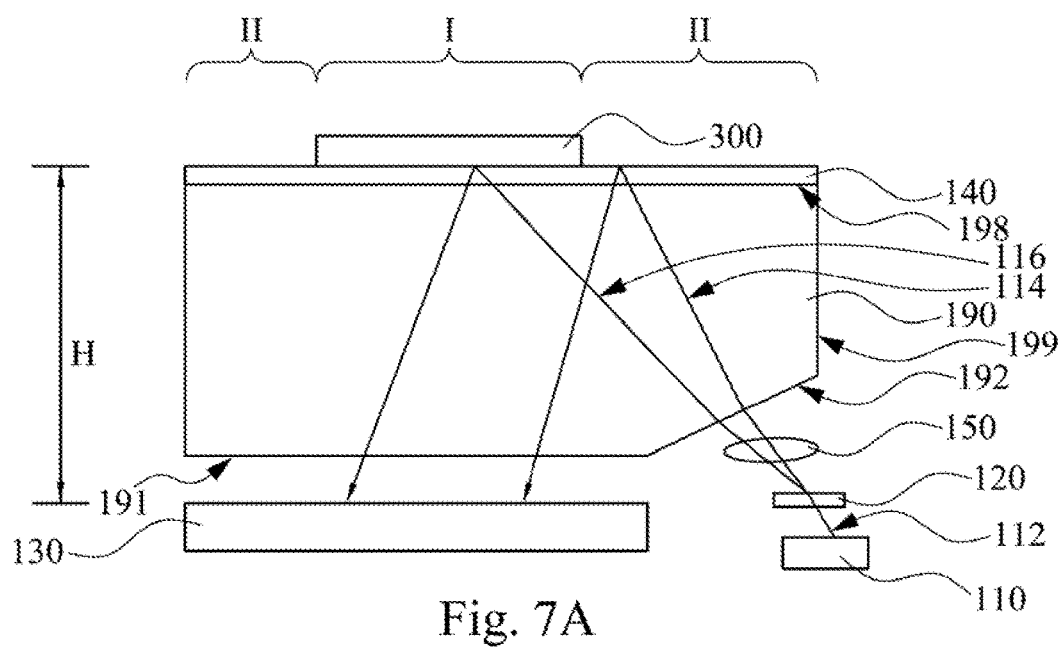
FIG. 7A is a schematic diagram of the digital holographic microscope according to a third embodiment of the present invention.

FIG. 7A is a schematic diagram of a digital holographic microscope according to a third embodiment of the present invention. The difference between the third embodiment and the first embodiment is that a guiding medium 190 is disposed between the optical module 140 and the image sensing device 130. The material of the guiding medium 190 can be glass or plastic. The guiding medium 190 has a guiding surface 192 configured for guiding the reference light beam 114 and the object light beam 116 to the optical module 140. The guiding surface 192 can adjust the propagation direction of the reference light beam 114 and the object light beam 116 in a manner similar to the way in which the reflective element 180 of the second embodiment performs this function, except that the guiding surface 192 guides the reference light beam 114 and the object light beam 116 by refraction. Therefore, compared to the first embodiment, the distance H between the sample 300 and the image sensing device 130 of the present embodiment can further be reduced.

In the present embodiment, a gap 198 which can be an air gap is formed between the guiding medium 190 and the optical module 140. However, the guiding medium 190 and the optical module 140 can be integrally formed in other embodiments, i.e., there is no gap 198 the guiding medium 190 and the optical module 140, such that the intensities of the reference light beam 114 and the object light beam 116 at the optical module 140 can be enhanced. However, the scope of the claimed invention should not be limited in these respects.

Figure 7B:
FIG. 7B is a top view of a guiding medium and an image sensing device of FIG. 7A.

Reference is made to FIG. 7A and FIG. 7B, where FIG. 7B is a top view of the guiding medium 190 and the image sensing device 130 of FIG. 7A, and the cross-section of FIG. 7A is along line A-A of FIG. 7B. Reflection can be enhanced at the surface 199 of the guiding medium 190 due to the refractive index difference. In other words, the light intensities of the reference light beam 114 and the object light beam 116 at the image sensing device 130 can be enhanced by the reflection of the surface 199 of the guiding medium 190 after the reference light beam 114 and the object light beam 116 are reflected by the optical module 140. In this embodiment, the vertical projection of the image sensing device 130 on the guiding medium 190 can substantially overlap the bottom surface 191 of the guiding medium 190, and the portion of the guiding medium 190 having the guiding surface 192 can be formed as a projection.

Moreover, the lens 150 is disposed between the guiding surface 192 of the guiding medium 190 and the grating 120 in the present embodiment. However, the scope of the claimed invention should not be limited in this respect. Other configurations fall within the scope of the claimed invention, such as disposing the lens 150 between the grating 120 and the light source 110. Furthermore, while not shown in FIG. 7A, the digital holographic microscope in the present embodiment can further include the light intensity modulator 160 and/or the reflective cover 170 (see FIG. 2). Other relevant structural details of the third embodiment are all the same as the first embodiment, and, therefore, a description in this regard will not be repeated hereinafter.

Figure 8:
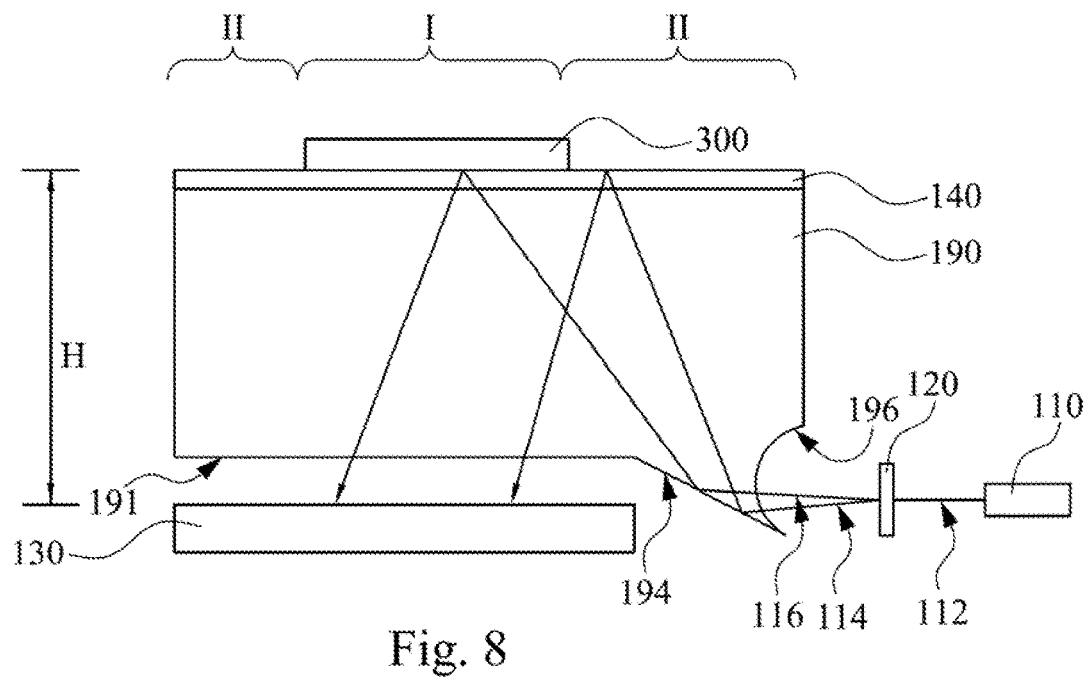
FIG. 8 is a schematic diagram of the digital holographic microscope according to a fourth embodiment of the present invention.

FIG. 8 is a schematic diagram of a digital holographic microscope according to a fourth embodiment of the present invention. The difference between the fourth embodiment and the third embodiment pertains to the shape of the guiding medium 190. In the present embodiment, the guiding medium 190 has a guiding surface 194 configured for guiding the reference light beam 114 and the object light beam 116 to the optical module 140. The guiding surface 194 can adjust the propagation direction of the reference light beam 114 and the object light beam 116 by reflection which is the same as the function of the reflective element 180 of the second embodiment. Therefore, compared to the first embodiment, the distance H between the sample 300 and the image sensing device 130 of the present embodiment can further be reduced, such that a larger light source 110 can be accommodated in the digital holographic microscope in the present embodiment.

Moreover, in one or more embodiments, a curved surface 196 can be formed in the guiding medium 190 to diverge the reference light beam 114 and the object light beam 116 to be formed into spherical waves, in which the function of the curved surface 196 is the same as the lens 150 (see FIG. 7A) of the third embodiment. In addition, although the curved surface 196 in FIG. 8 is concave into the guiding medium 190, the curved surface 196 can be convex in other embodiments. Also, the top view of the guiding medium 190 in the present embodiment is the same as that in FIG. 7B except for the shape of the guiding surface 196.

Furthermore, while not shown in FIG. 8, the digital holographic microscope in the present embodiment can further include the light intensity modulator 160 and/or the reflective cover 170 (see FIG. 2). Other relevant structural details of the fourth embodiment are all the same as the third embodiment, and, therefore, a description in this regard will not be repeated hereinafter.

Figure 9A:
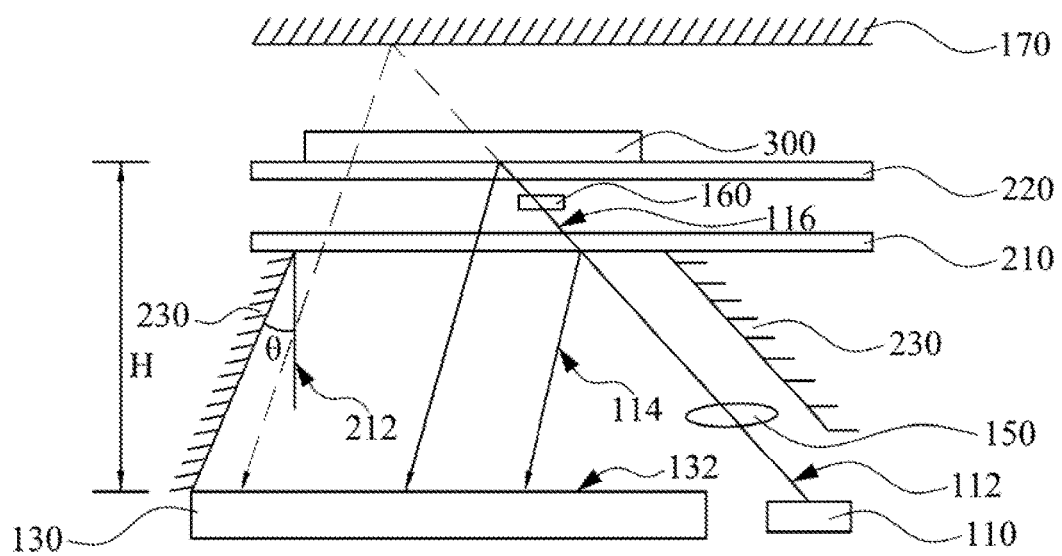
FIG. 9A is a schematic diagram of the digital holographic microscope according to a fifth embodiment of the present invention.

FIG. 9A is a schematic diagram of a digital holographic microscope according to a fifth embodiment of the present invention. The difference between the fourth embodiment and the first embodiment is the grating and the optical module. In the present embodiment, the optical module and the grating form a holographic optical element 210 with a diffraction pattern. In other words, the holographic optical element 210 can split the light beam 112 into the reference light beam 114 and the object light beam 116, guide the reference light beam 114 to the image sensing device 130, and guide the object light beam 116 to the sample 300.

In greater detail, the light beam 112 emitted from the light source 110 is incident the holographic optical element 210. The diffraction pattern of the holographic optical element 210 can be formed by storing the interference of the reference light beam 114 and the object light beam 116 configured to be incident the sample 300. A portion of the light beam 112 is diffracted in the holographic optical element 210 to become the reference light beam 114. The reference light beam 114 is then reflected to the image sensing device 130 by the holographic optical element 210. Moreover, another portion of the light beam 112 can pass through the holographic optical element 210 to the sample 300, and this portion of the light beam 112 becomes the object light beam 116. The object light beam 116 reflected from the sample 300 then passes through the holographic optical element 210 again, and then is incident the image sensing device 130. Therefore, the reference light beam 114 and the object light beam 116 at the image sensing device 130 can interfere to form an interference pattern. The interference pattern is recorded by the image sensing device 130 and is transformed into a digital signal. The outer appearance of the sample 300 can be determined from the digital signal, and an image of the sample 300 is generated from such a determination.

In one or more embodiments, the diffraction efficiency of the holographic optical element 210 is smaller than 20% and larger than 0.1%, such that almost all of the light beam 112 can pass through the holographic optical element 210 to become the object light beam 116, and the light intensity of the object light beam 116 can be enhanced.

Figure 1:
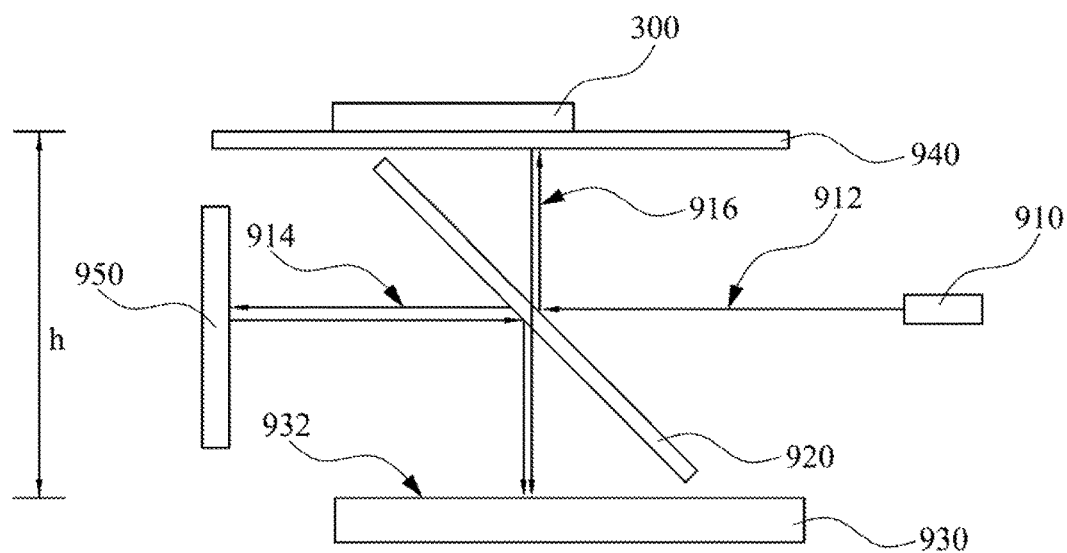
FIG. 1 is a schematic diagram of a conventional digital holographic microscope.

In the present embodiment, the holographic optical element 210 can be substantially parallel to a light collecting surface 132 of the image sensing device 130 for reducing the distance H between the sample 300 and the image sensing device 130, such that the distance H can be smaller than the distance h shown in FIG. 1. Therefore, the digital holographic microscope of the present embodiment can be made to a small size due to the relatively small distance H.

In one or more embodiments, the digital holographic microscope can further include a light intensity modulator 160 disposed between the holographic optical element 210 and the sample 300, and the light intensity modulator 160 is configured for modulating the light intensity of the object light beam 116. The light intensities of the reference light beam 114 and the object light beam 116 at the image sensing device 130 can be adjusted to obtain a high-quality interference pattern. In the present embodiment, the light intensity modulator 160 can be disposed on the propagation path of the object light beam 116, so as to modulate the light intensity of the object light beam 116 based on the light intensity of the reference light beam 114 at the image sensing device 130, such that the light intensities of the reference light beam 114 and the object light beam 116 at the image sensing device 130 can be matched to obtain a high-quality interference pattern.

Figure 9B:
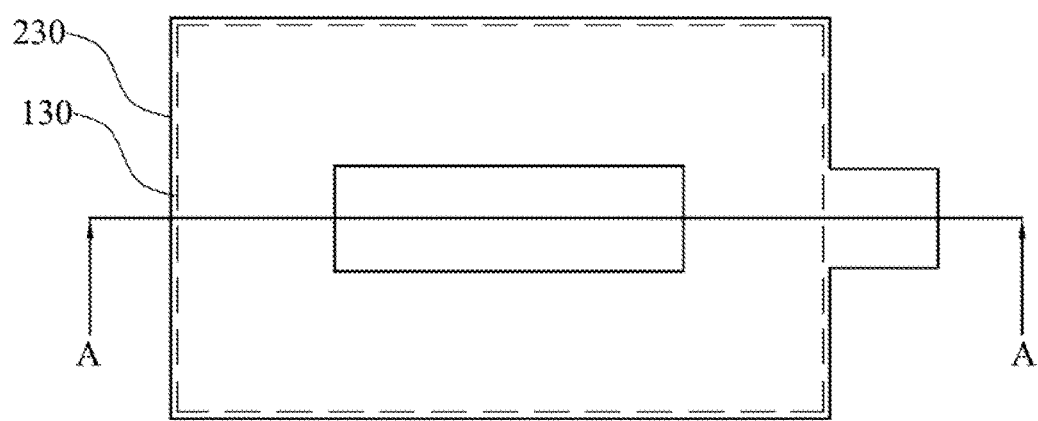
FIG. 9B is a top view of a reflective side wall and the image sensing device of FIG. 9A.

Reference is made to FIG. 9A and FIG. 9B, where FIG. 9B is a top view of the reflective side wall 230 and the image sensing device 130 of FIG. 9A, and the cross-section of FIG. 9A is along line A-A of FIG. 9B. In one or more embodiments, the digital holographic microscope can further include at least one reflective side wall 230 disposed between the holographic optical element 210 and the image sensing device 130. The reflective side wall 230 is configured for guiding the object light beam 116 reflected from the sample 300 to the image sensing device 130. In greater detail, when the spatial frequency of the sample is high, the object light beam 116 reflected from the sample 300 has a higher angular frequency and a higher scattering angle. In other words, the higher spatial frequency portion of the object light beam 116 at the image sensing device 130 has a lower intensity. However, the higher spatial frequency portion of the object light beam 116 can be reflected to the image sensing device 130 by the reflective side wall 230 to increase the intensity. Moreover, the light collecting surface 132 of the image sensing device 130 can be adjacent to a side of the reflective side wall 230 opposite to the holographic optical element 210, and the reflected side wall 230 can be disposed around the light collecting surface 132 except at a portion close to the light source 110 for collecting the object light beam 116 reflected from the sample 300. In the present embodiment, an angle θ is formed between the reflective side wall 230 and a normal line 212 of the holographic optical element 210 (i.e., a line normal to the holographic optical element 210), in which the angle θ is greater than 0 degrees and less than or equal to 60 degrees.

Reference is made back to FIG. 9A. In one or more embodiments, the digital holographic microscope can further include a lens 150 disposed between the holographic optical element 210 and the light source 110. The lens 150 can diverge the light beam 112 to be formed into a light beam with a spherical wave, such that the pattern widths of the interference pattern are wider, so as to allow for more efficient signal analysis. Moreover, the incident angle of the light beam 112 at the holographic optical element 210 can be changed by adjusting the horizontal position of the lens 150, in which "horizontal" here means the extension direction of the holographic optical element 210. Furthermore, although the lens 150 in FIG. 9A is a convex lens, the lens 150 can be a concave lens in other embodiments.

In one or more embodiments, the digital holographic microscope can further include a supporting plate 220 configured for supporting the sample 300. The object light beam 116 emitted from the holographic optical element 210 can pass through the supporting plate 220 to the sample 300, and the object light beam 116 reflected from the sample 300 can pass through the supporting plate 220 again and be incident the holographic optical element 210. The supporting plate 220 can be a transparent plate, for example, a glass plate or a plastic plate. However, the scope of the claimed invention should not be limited in this respect.

The digital holographic microscope can further include a reflective cover 170 disposed at a side of the sample 300 opposite to the holographic optical element 210. Other relevant structural details of the fifth embodiment are all the same as the first embodiment, and, therefore, a description in this regard will not be repeated hereinafter.

Figure 10:
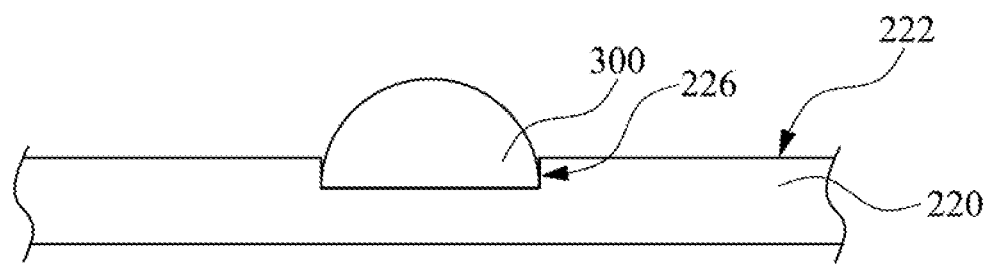
FIG. 10 is a localized schematic diagram of the sample and a supporting plate according to one embodiment of the present invention.

Reference is made to FIG. 10, which is a localized schematic diagram of the sample 300 and the supporting plate 220 according to one embodiment of the present invention. In one or more embodiments, the supporting plate 220 supporting the sample 300 can have a recess 226 when the sample 300 is in a liquid state. The recess 226 is formed in the surface 222 of the supporting plate 220, and the recess 226 is configured for accommodating the sample 300.

Figure 11:
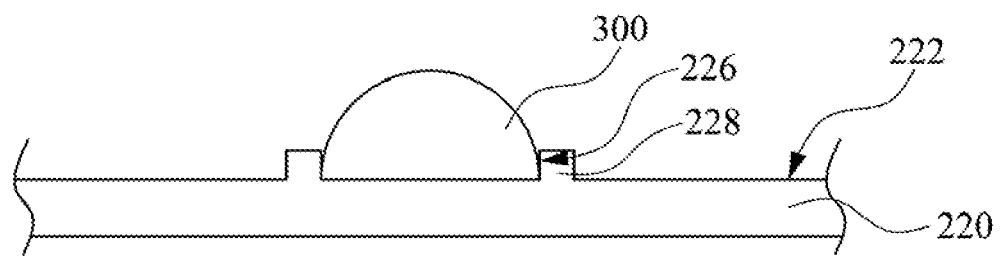
FIG. 11 is a localized schematic diagram of the sample and the supporting plate according to another embodiment of the present invention.

The structure of the recess 226 is not limited to the configuration shown in FIG. 10. Reference is made to FIG. 11 which is a localized schematic diagram of the sample 300 and the supporting plate 220 according to another embodiment of the present invention. The supporting plate 220 has a salient portion 228 disposed at the surface 222 of the supporting plate 220. The salient portion 228 defines the recess 226 configured for accommodating the sample 300.

Figure 12:
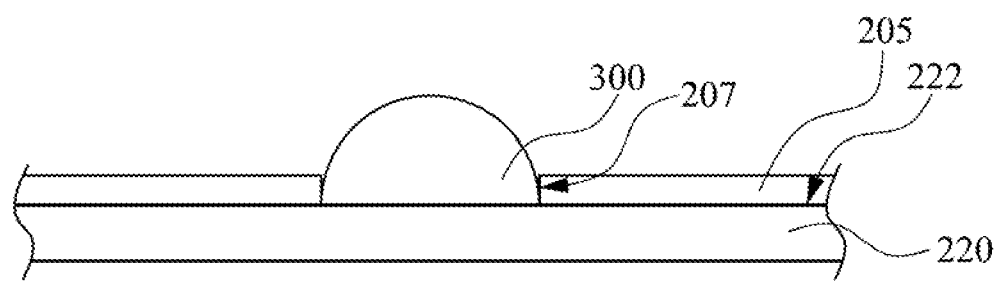
FIG. 12 is a localized schematic diagram of the sample and the supporting plate according to yet another embodiment of the present invention.

Reference is made to FIG. 12 which is a localized schematic diagram of the sample 300 and the supporting plate 220 according to yet another embodiment of the present invention. In this embodiment, the digital holographic microscope can further include a hydrophobic material layer 205 covering at least one portion of the surface 222 of the supporting plate 220, and the hydrophobic material layer 205 defines a measuring area 207, such that the sample 300 in the liquid state can be confined to the measuring area 207.

Figure 13:
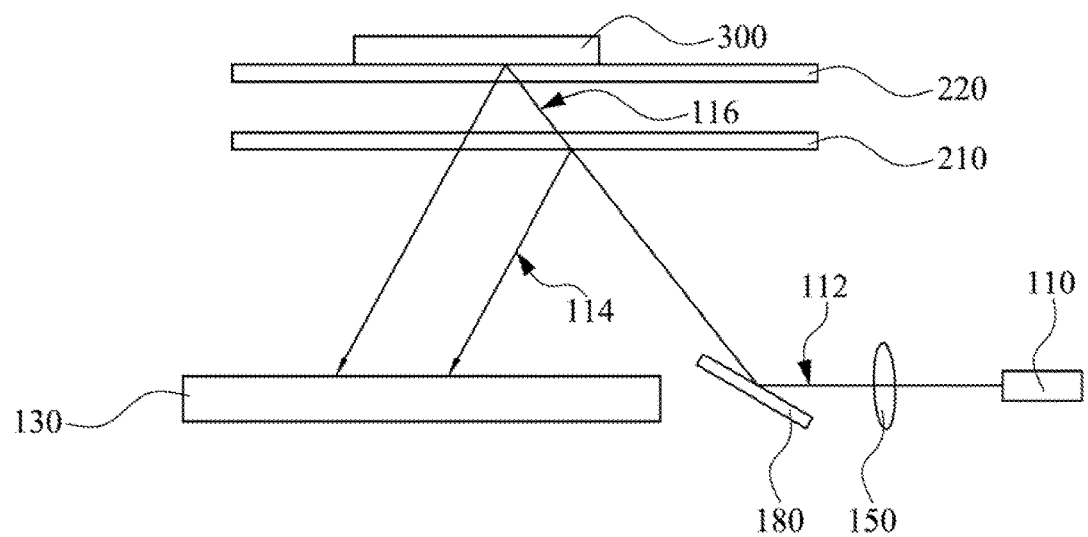
FIG. 13 is a schematic diagram of the digital holographic microscope according to a sixth embodiment of the present invention.

FIG. 13 is a schematic diagram of a digital holographic microscope according to a sixth embodiment of the present invention. The difference between the sixth embodiment and the fifth embodiment is that a reflective element 180 is disposed between the light source 110 and the holographic optical element 210. The reflective element 180 is configured for adjusting the propagation direction of the light beam 112. By disposing the reflective element 180 in a particular manner as shown in FIG. 13, the light source 110 can be moved to a side of the reflective element 180 opposite to the image sensing device 130, such that the digital holographic microscope in this embodiment can accommodate a larger light source 110.

Moreover, the lens 150 is disposed between the reflective element 180 and the light source 110 in the present embodiment. However, the scope of the claimed invention should not be limited in this respect. Other configurations fall within the scope of the claimed invention, such as disposing the lens 150 between the reflective element 180 and the holographic optical element 210.

Furthermore, while not shown in FIG. 13, the digital holographic microscope in the present embodiment can further include the light intensity modulator 160, the reflective cover 170, and/or the reflective side wall 230 (see FIG. 9A). Other relevant structural details of the sixth embodiment are all the same as the fifth embodiment, and, therefore, a description in this regard will not be repeated hereinafter.

Figure 14A:
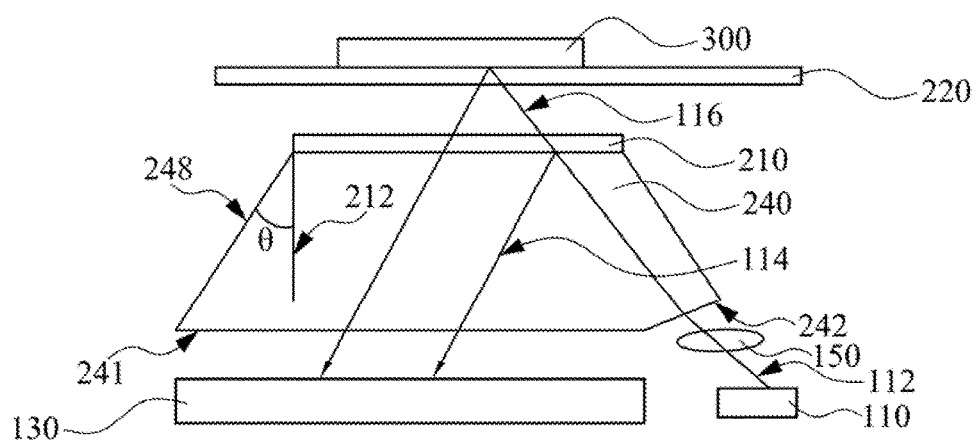
FIG. 14A is a schematic diagram of the digital holographic microscope according to a seventh embodiment of the present invention.

FIG. 14A is a schematic diagram of a digital holographic microscope according to a seventh embodiment of the present invention. The difference between the seventh embodiment and the fifth embodiment is that a guiding medium 240 is disposed between the holographic optical element 210 and the image sensing device 130. The material of the guiding medium 240 can be glass or plastic. The guiding medium 240 has a guiding surface 242 configured for guiding the light beam 112 to the holographic optical element 210. The guiding surface 242 can adjust the propagation direction of the light beam 112 in a manner similar to the way in which the reflective element 180 of the sixth embodiment performs this function, except that the guiding surface 242 guides the light beam 112 by refraction. Therefore, the digital holographic microscope in this embodiment can accommodate a larger light source 110.

Figure 14B:
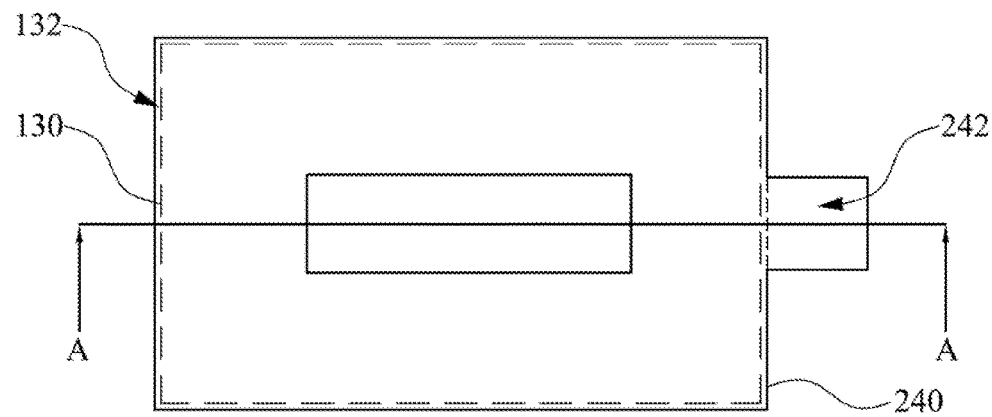
FIG. 14B is a top view of the guiding medium and the image sensing device of FIG. 14A.

Reference is made to FIG. 14A and FIG. 14B, where FIG. 14B is a top view of the guiding medium 240 and the image sensing device 130 of FIG. 14A, and the cross-section of FIG. 14A is along line A-A of FIG. 14B. In the present embodiment, the guiding medium 240 further has a reflective surface 248 configured for guiding the object light beam 116 reflected from the sample 300 to the image sensing device 130. The function of the reflective surface 248 is the same as that of the reflective side wall 230 of the fifth embodiment. An angle θ is formed between the reflective surface 248 and the normal line 212 of the holographic optical element 210 (i.e., a line normal to the holographic optical element 210), in which the angle θ is greater than 0 degrees and less than or equal to 60 degrees. Moreover, the vertical projection of the image sensing device 130 on the guiding medium 240 can substantially overlap the bottom surface 241 of the guiding medium 240, and the portion of the guiding medium 240 having the guiding surface 242 can be formed as a projection.

Moreover, while not shown in FIG. 14A, the digital holographic microscope in the present embodiment can further include the light intensity modulator 160 and/or the reflective cover 170 (see FIG. 9A). Other relevant structural details of the seventh embodiment are all the same as the fifth embodiment, and, therefore, a description in this regard will not be repeated hereinafter.

Figure 15:
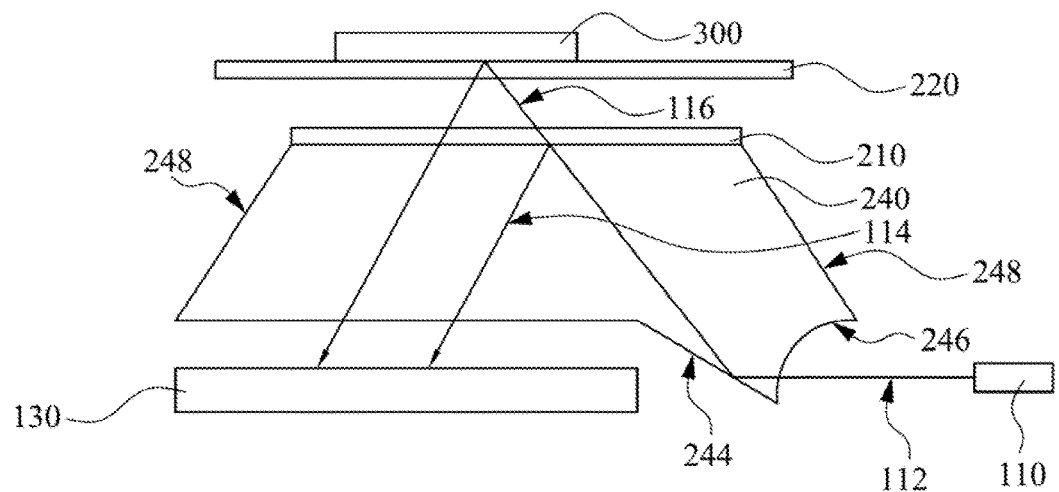
FIG. 15 is a schematic diagram of the digital holographic microscope according to an eighth embodiment of the present invention.

FIG. 15 is a schematic diagram of a digital holographic microscope according to an eighth embodiment of the present invention. The difference between the eighth embodiment and the seventh embodiment pertains to the shape of the guiding medium 240. In the present embodiment, the guiding medium 240 has a guiding surface 244 configured for guiding the light beam 112 to the holographic optical element 210. The guiding surface 244 can adjust the propagation direction of the light beam 112 by reflection which is the same as the function of the reflective element 180 of the sixth embodiment.

Moreover, in one or more embodiments, a curved surface 246 can be formed in the guiding medium 240 to diverge the light beam 112 to be formed into a spherical wave, in which the function of the curved surface 246 is the same as that of the lens 150 (see FIG. 14A) of the seventh embodiment. In addition, although the curved surface 246 in FIG. 15 is concave into the guiding medium 240, the curved surface 246 can be convex in other embodiments. The top view of the guiding medium 240 in the present embodiment is the same as that in FIG. 14B except for the shape of the guiding surface 246.

Furthermore, while not shown in FIG. 15, the digital holographic microscope in the present embodiment can further include the light intensity modulator 160 and/or the reflective cover 170 (see FIG. 9A). Other relevant structural details of the eighth embodiment are all the same as the seventh embodiment, and, therefore, a description in this regard will not be repeated hereinafter.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims.

What is claimed is:

1. A digital holographic microscope, comprising:
a light source for providing a light beam;
a grating disposed between the light source and a sample, the grating splitting the light beam into a reference light beam and an object light beam, wherein the reference light beam is reflected by the grating, a light path of the reflected reference light beam is separated from the sample, and the object light beam is a zero order diffraction light beam and incident the sample;
an image sensing device for collecting the reflected reference light beam, and collecting the object light beam reflected from the sample; and
an optical module disposed between the light source and the sample for guiding the reflected reference light beam to the image sensing device, and guiding the object light beam to the sample.

2. The digital holographic microscope of claim 1, wherein the optical module and the grating form a holographic optical element with a diffraction pattern.

3. The digital holographic microscope of claim 2, wherein the diffraction efficiency of the holographic optical element is smaller than 20% and larger than 0.1%.

4. The digital holographic microscope of claim 2, wherein the holographic optical element is substantially parallel to a light collecting surface of the image sensing device.

5. The digital holographic microscope of claim 2, further comprising a light intensity modulator disposed between the holographic optical element and the sample, wherein the light intensity modulator modulates the light intensity of the object light beam.

6. The digital holographic microscope of claim 2, further comprising at least one reflective side wall disposed between the holographic optical element and the image sensing device, wherein the reflective side wall guides the object light beam reflected from the sample to the image sensing device.

7. The digital holographic microscope of claim 6, wherein an angle is formed between the reflective side wall and a normal line of the holographic optical element, and the angle is greater than 0 degrees and less than or equal to 60 degrees.

8. The digital holographic microscope of claim 2, further comprising a supporting plate for supporting the sample.

9. The digital holographic microscope of claim 8, further comprising a hydrophobic material layer covering at least one portion of a surface of the supporting plate facing the sample, the hydrophobic material layer surrounding the sample.

10. The digital holographic microscope of claim 8, wherein the supporting plate has a recess for accommodating the sample.

11. The digital holographic microscope of claim 1, further comprising a lens disposed between the light source and the optical module.

12. The digital holographic microscope of claim 1, further comprising a reflective element disposed between the light source and the optical module.

13. The digital holographic microscope of claim 1, further comprising a guiding medium disposed between the optical module and the image sensing device, wherein the guiding medium has a guiding surface.

14. The digital holographic microscope of claim 1, wherein the image sensing device is a charged-couple device (CCD) or a complementary metal oxide semiconductor (CMOS).

15. The digital holographic microscope of claim 1, further comprising a reflective cover disposed at a side of the sample opposite to the optical module.

* * * * *